(12) United States Patent
Tsai et al.

(10) Patent No.: US 8,172,186 B2
(45) Date of Patent: May 8, 2012

(54) DISPLAY SUPPORT SEAT (75) Inventors: Wen Hsi Tsai, Taipei (TW); Te An Lin, Taipei (TW); Chin Hsiung Chen, Taipei (TW); Shuang Ji Jiang, Taipei (TW)

(73) Assignee: Aopen Incorporated, Taipei (TW)

( * ) Notice: Subject to any disclaimer, the term of this patent is extended or adjusted under 35 U.S.C. 154(b) by 280 days.

(21) Appl. No.: 12/504,743

(22) Filed: Jul. 17, 2009

(65) Prior Publication Data
US 2011/0011990 A1 Jan. 20, 2011

(51) Int. Cl.
*G06F 1/16* (2006.01)
(52) U.S. Cl. ........ 248/121; 248/918; 248/919; 248/127; 361/679.22
(58) Field of Classification Search ............ 248/917, 248/919, 920, 921, 922, 127, 121, 122.1; 361/679.02, 679.05, 679.21, 679.22, 679.26, 361/679.31, 679.46
See application file for complete search history.

(56) References Cited

U.S. PATENT DOCUMENTS

| | | | |
|---|---|---|---|
| 6,381,125 B1 * | 4/2002 | Mizoguchi et al. | 361/679.08 |
| 7,061,754 B2 * | 6/2006 | Moscovitch | 361/679.21 |
| 7,796,772 B2 * | 9/2010 | Takahashi et al. | 381/333 |
| 7,946,548 B2 * | 5/2011 | Sun | 248/231.31 |
| 2005/0270732 A1 * | 12/2005 | Titzler et al. | 361/681 |
| 2007/0102600 A1 * | 5/2007 | Ishizaki et al. | 248/176.3 |
| 2010/0141864 A1 * | 6/2010 | Lai | 349/58 |

* cited by examiner

*Primary Examiner* — Terrell McKinnon
*Assistant Examiner* — Steven Marsh
(74) *Attorney, Agent, or Firm* — Bacon & Thomas, PLLC (57) ABSTRACT

A display support seat is mounted on a display, such that the display is able to be located on a plane after being supported. In the present invention, a main seat and a cover are mounted to form an accommodation space, and the display is mounted on the main seat. Also, the accommodation space is provided for a main board module to be disposed therein, so as to form a computer host. In such a manner, assembly space demands for a computer and a display is effectively reduced. Moreover, a user may select that the present invention merely serves as a support seat, or merely serves as a computer host, or serve as a support seat and a computer host at the same time depending on practical use demands.

5 Claims, 11 Drawing Sheets

DISPLAY SUPPORT SEAT

BACKGROUND OF THE INVENTION

1. Field of the Invention

The present invention relates to a display support seat, which is used to support a display such that the display is located on a plane after the display is mounted, and more particularly, to a display support seat in which an accommodation space is formed and a main board module is able to be mounted in the accommodation space to form a computer host.

2. Related Art

Figure 1:
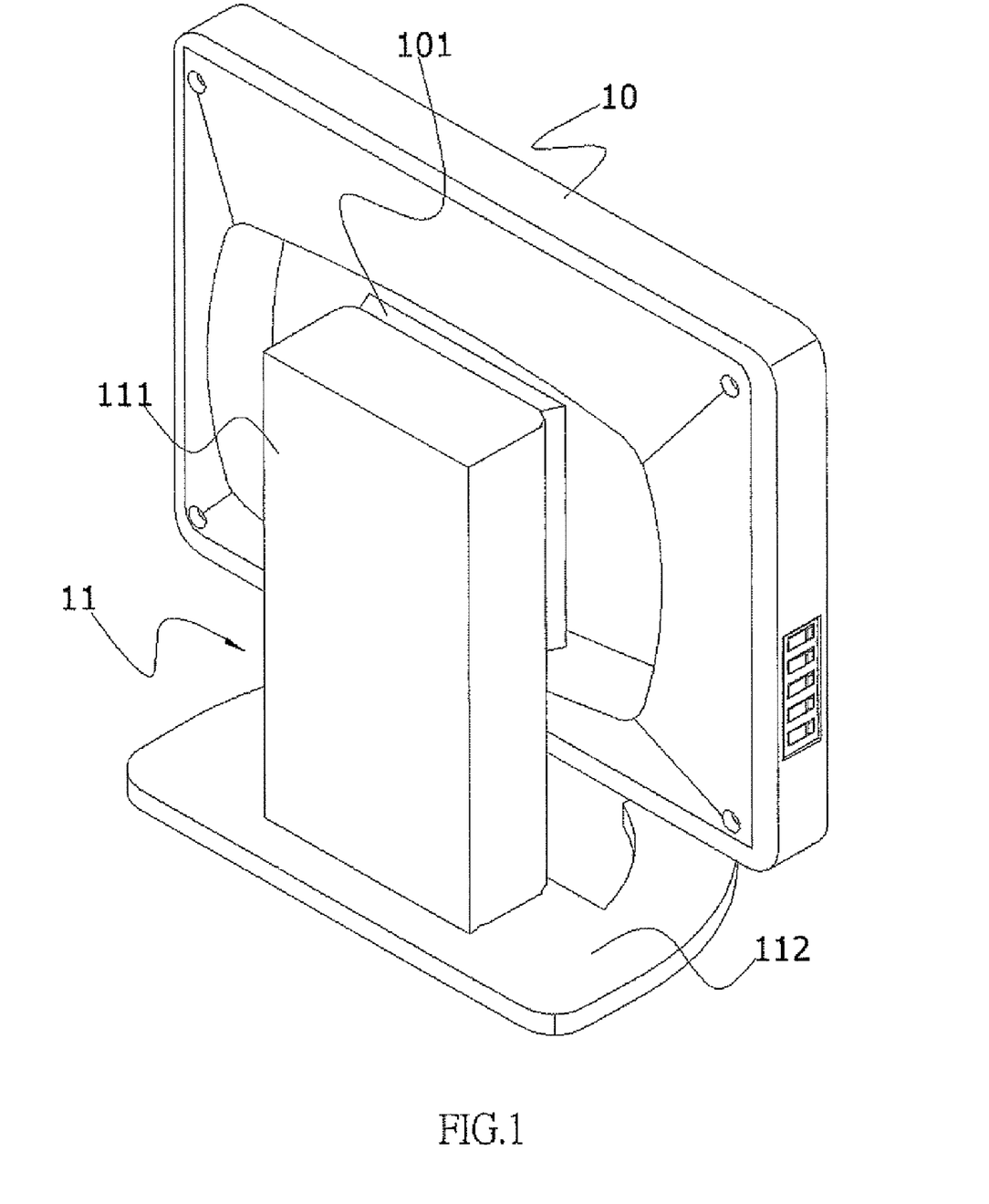
FIG. 1 is a three-dimensional appearance view of a conventional display.

A display support seat mainly enables a display to be firmly located on a plane after the display is mounted. The major concerns for applications of its related structures are providing a favorable support force, stability, and assembly ease. Therefore, in existing applications, the support seat only provides supporting and fixing functions. FIG. 1 is a three-dimensional appearance view of a conventional display. Referring to FIG. 1, an assembling part 101 is formed on a rear surface of a display 10. A support seat 11 is formed of a main support seat 111 and a base seat 112. An upper side part of the main support seat 111 and the assembling part 101 on the rear surface of the display 10 are mounted, such that the display 10 is suspended on the main support seat 111. The display 10 is stably located on a plane through a support force from the main support seat 111 and its base seat 112. During the application of the display 10, a computer host still needs to be provided. When the two are in informational communication with each other, execution results of the computer host are presented on the display. As discussed above, the display 10 and the computer host are two independent units. During the application, a suitable space is needed for the both to locate the display 10 and the computer host at the same time. Generally, the display is located on a desktop, and the computer host is usually located in a space below the desktop due to relatively large volume. Recently, some manufacturers have developed minicomputers with smaller volumes in the market according to the demands of space reduction, mounting ease, and construction cost reduction. The volume of the minicomputer is usually about one third to one fourth of the volume of a normal host. During the application, the computer host is suspended in the rear side of the display, so as to save mounting space. However, the applicability may be greatly increased if the space is saved and the functions of the display and the computer host are integrated at the same time.

SUMMARY OF THE INVENTION

The present invention is directed to a display support seat capable of providing a functional application after mounting according to use demands.

To achieve the above objective, the present invention provides an entity having supporting and fixing functions, which includes a main seat and a cover. An accommodation space is formed between the main seat and the cover, and is provided for a main board module to be mounted therein, thus forming a computer host after mounting. During the application, it may be selected that the present invention merely serves as a display support seat, or a computer host, or has functions of a support and a computer host at the same time depending on practical demands.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 2:
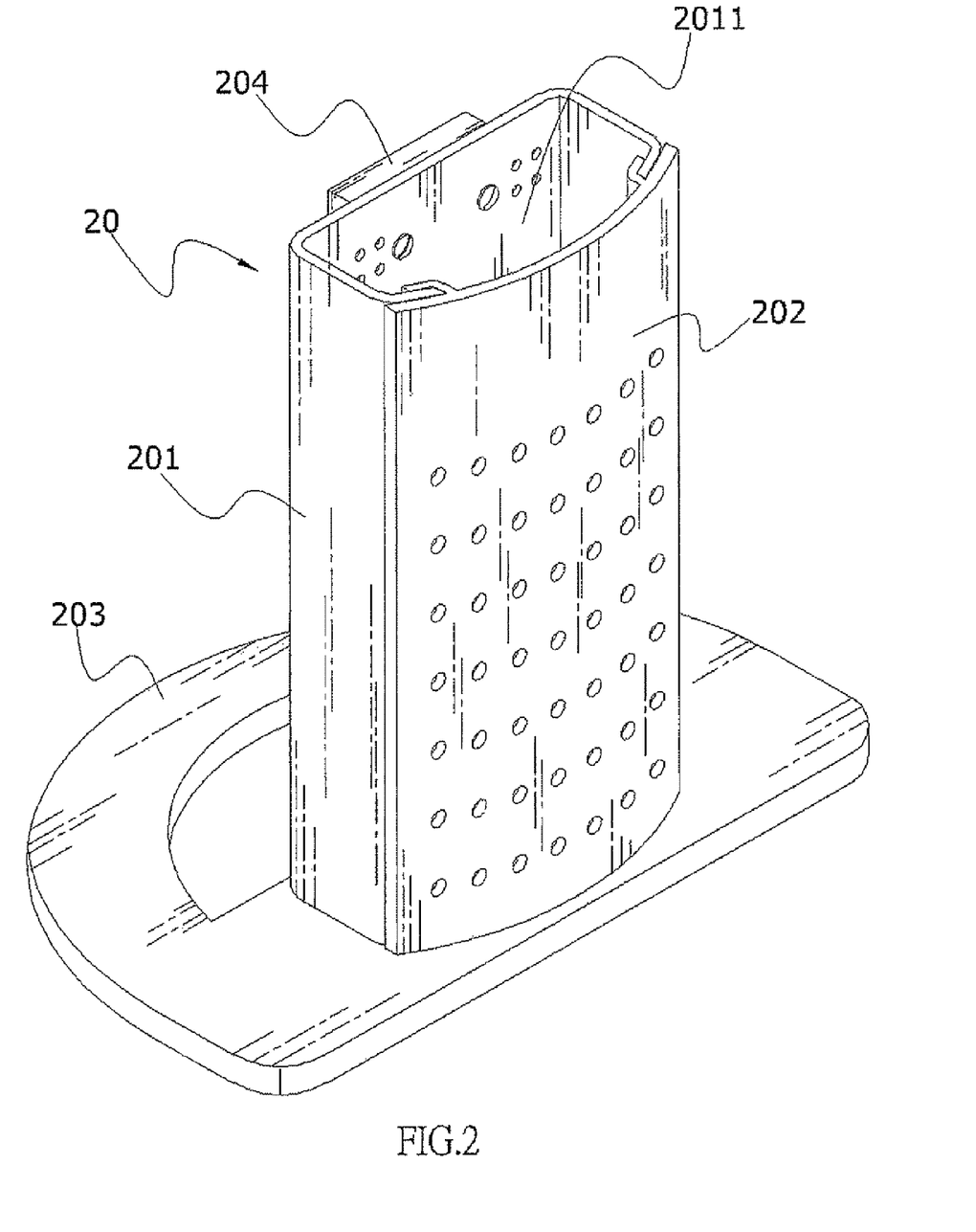
FIG. 2 is a three-dimensional appearance view of the present invention.

FIG. 2 is a three-dimensional appearance view of the present invention. As shown in FIG. 2, a display support seat 20 is mainly formed of a main seat 201, a cover 202, a base seat 203, and a mounting bracket 204. An accommodation space 2011 is formed after the main seat 201 and the cover are mounted to each other. Also, the main seat 201 is mounted above the base seat 203, such that the main seat 201 is located on a plane through the base seat 203, and the main seat 201 provides an effective supporting function. Referring to FIG. 2 again, the mounting bracket 204 is mounted on a plane of the main seat 201, so as to mount with a display (not shown). The display is supported by the main seat 201 in the present invention, and is firmly located on a plane through the base seat 203.

Figure 3:
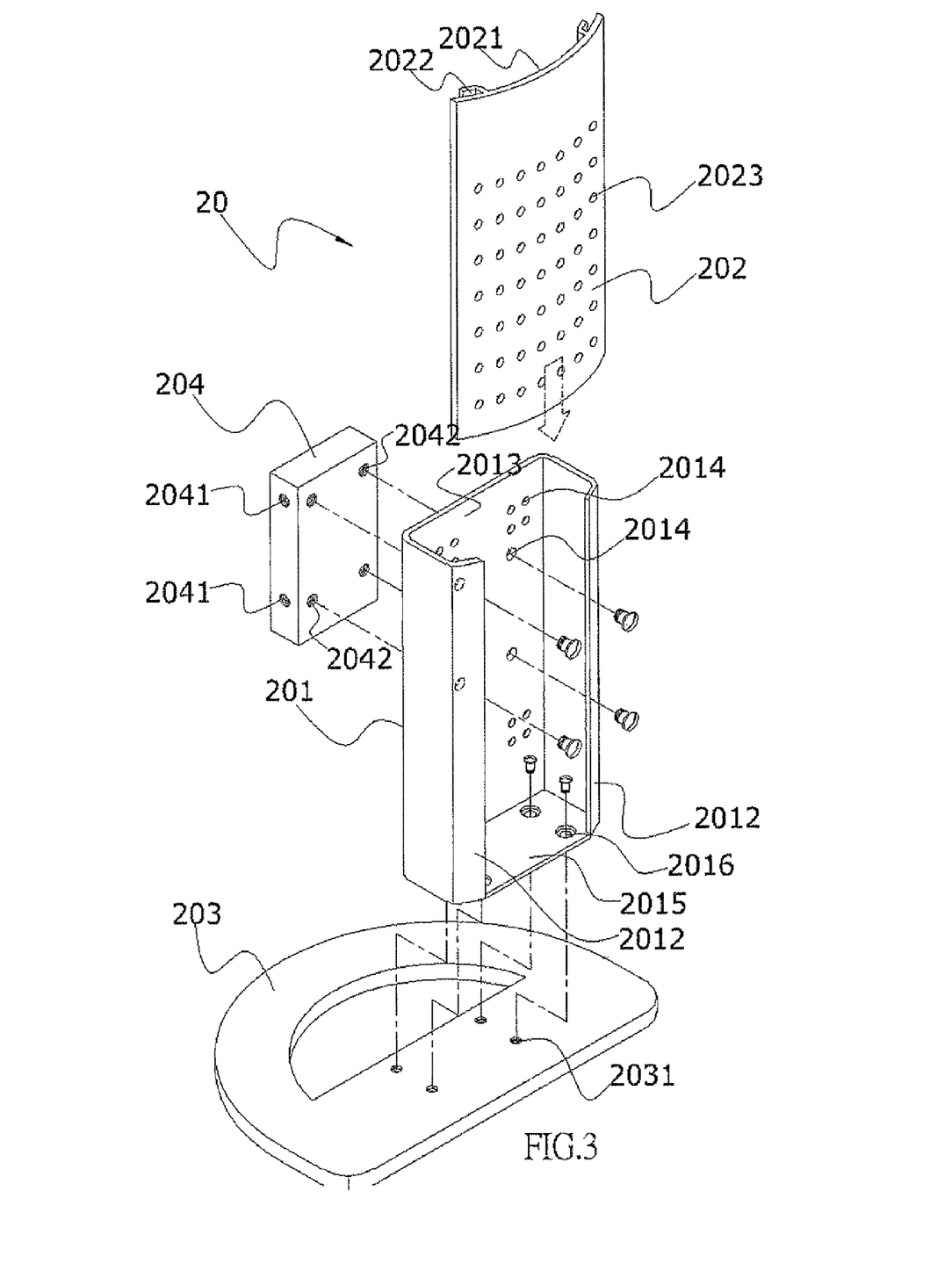
FIG. 3 is a schematic combined view of members according to the present invention.

FIG. 3 is a schematic combined view of members according to the present invention. As shown in FIG. 3, two baffles 2012 in a covering shape and opposing each other are formed at the main seat 201. A plurality of through holes 2014 is formed on a support surface 2013 of the main seat 201. A plurality of through holes 2016 is also formed on a horizontal mounting plane 2015 of the main seat 201. A set of corresponding mounting parts 2022 is formed on a plane 2021 of the cover 202 facing the main seat. The mounting part 2022 is in a rail shape, and may also be replaced by other types, for example, a hook shape. Also, a plurality of air holes 2023 is formed on a plane of the cover 202. A bottom plane of the base seat 203 enables the base seat 203 to be located on a plane horizontally. A plurality of screw holes 2031 is formed on a plane of the base seat 203. A plurality of screw holes (2041, 2042) is respectively formed on each plane of the mounting bracket 204. As shown in FIG. 3, when mounting the members, the main seat 201 is mounted on the plane of the base seat 203. In this embodiment in FIG. 3, a plurality of screws 205 serves as securing elements, such that the main seat 201 and the base seat 203 are mutually mounted. Also, the mounting bracket 204 is mounted on an external plane of the main seat 201, and the cover 202 is mounted on the baffle 2012 of the main seat 201. As shown in FIG. 3, the cover 202 slides in downwards along an edge of the baffle 2012 with its mounting part 2022, so as to accomplish the mounting.

Figure 4:
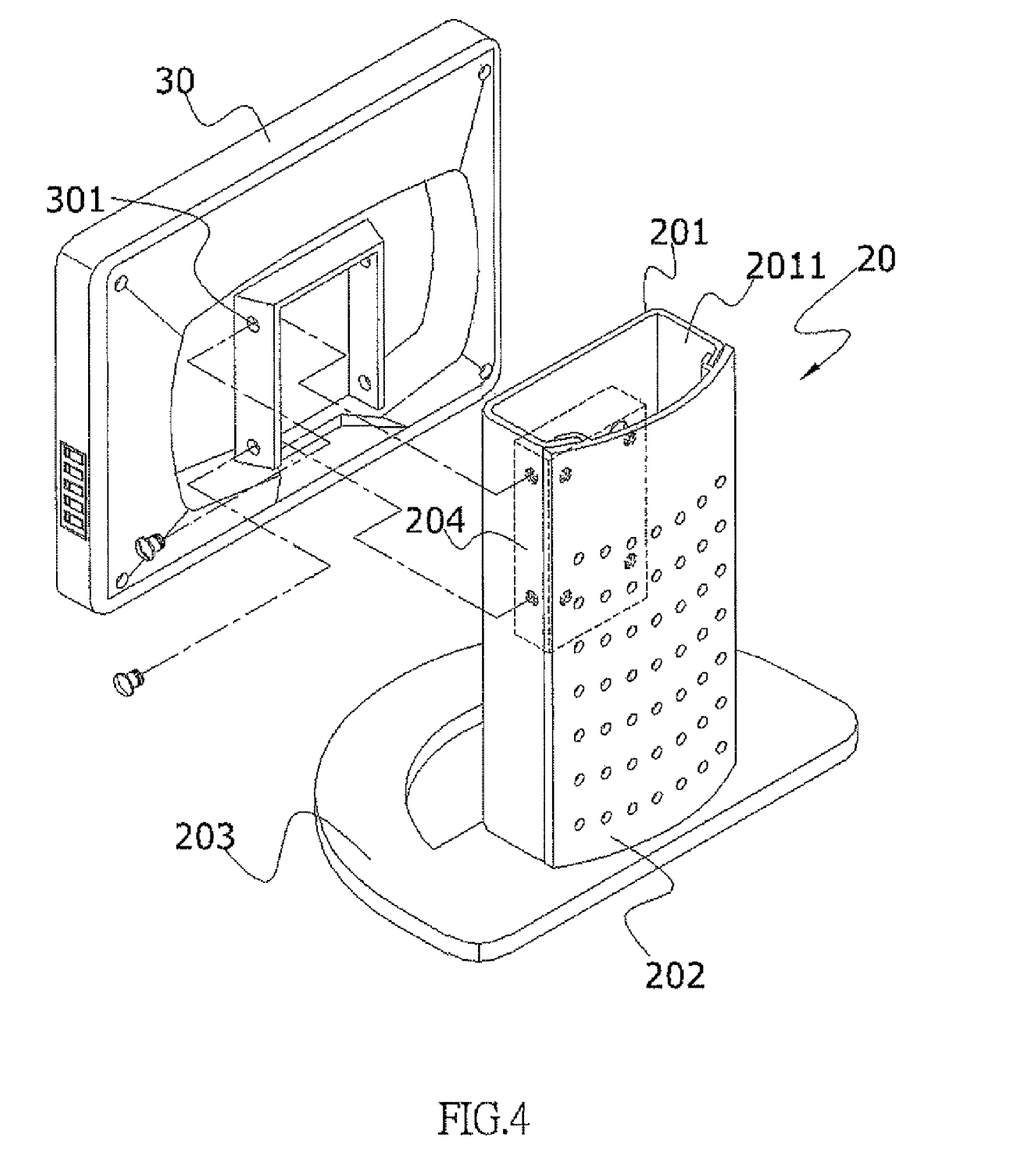
FIG. 4 is a first schematic view of an embodiment of the present invention.
Figure 5:
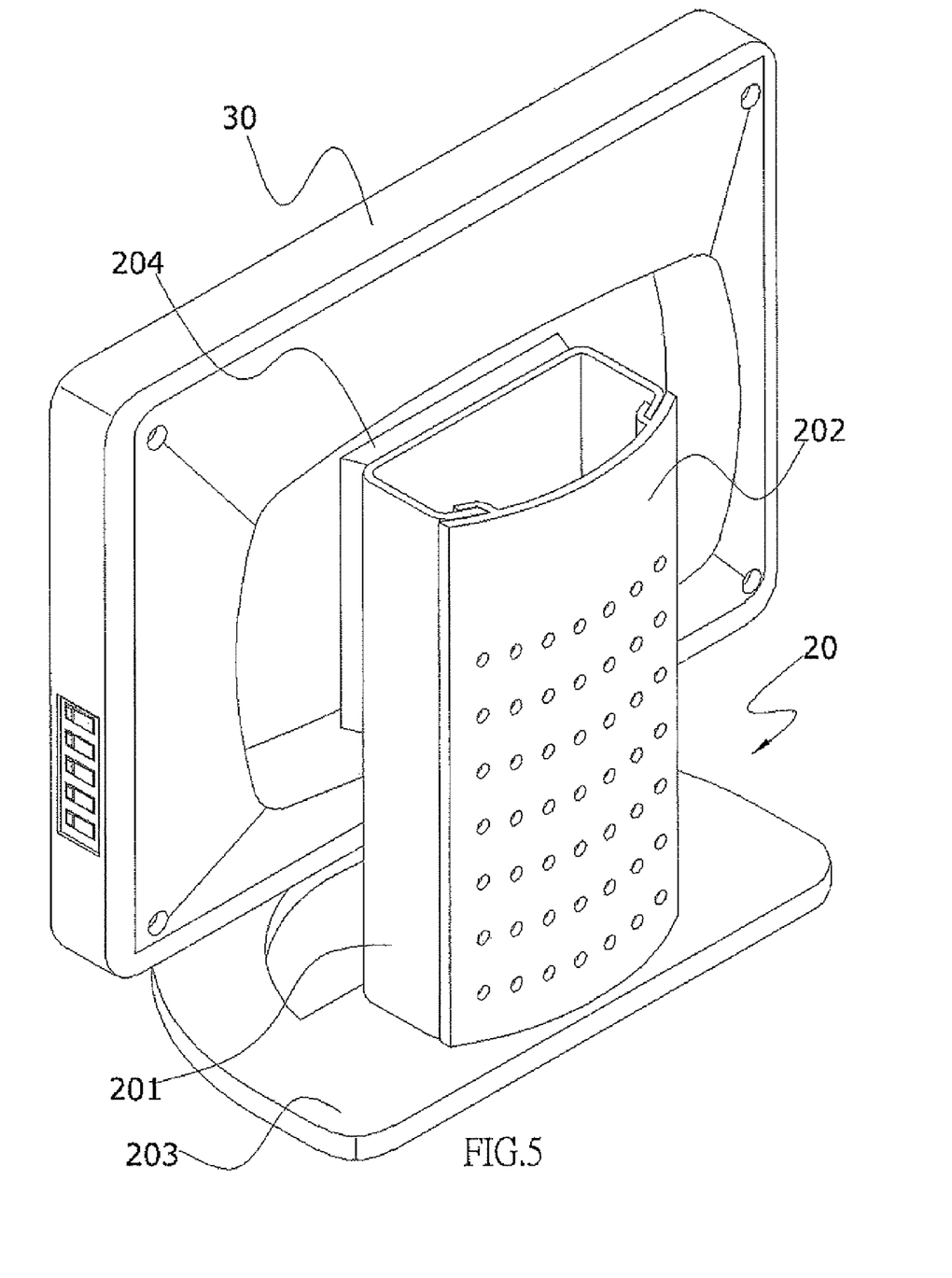
FIG. 5 is a second schematic view of an embodiment of the present invention.

FIG. 4 is a first schematic view of an embodiment of the present invention. As shown in FIG. 4, an accommodation space 2011 is formed after the main seat 201 and the cover 202 are mounted, and the accommodation space 2011 serves as a space required by wiring. Also, an assembling part 301 is formed at a rear surface of a display 30. During assembling, the assembling part 301 of the display 30 corresponds to the main seat 201, and the two are secured to each other, such that the display 30 is fixed at a position near an upper edge of the main seat 201. In such a manner, in the present invention, the support seat of the display 30 is formed (that is, the display support seat 20 of the present invention). Refer to FIG. 5 at the same time. FIG. 5 is a second schematic view of an embodiment of the present invention.

Figure 6:
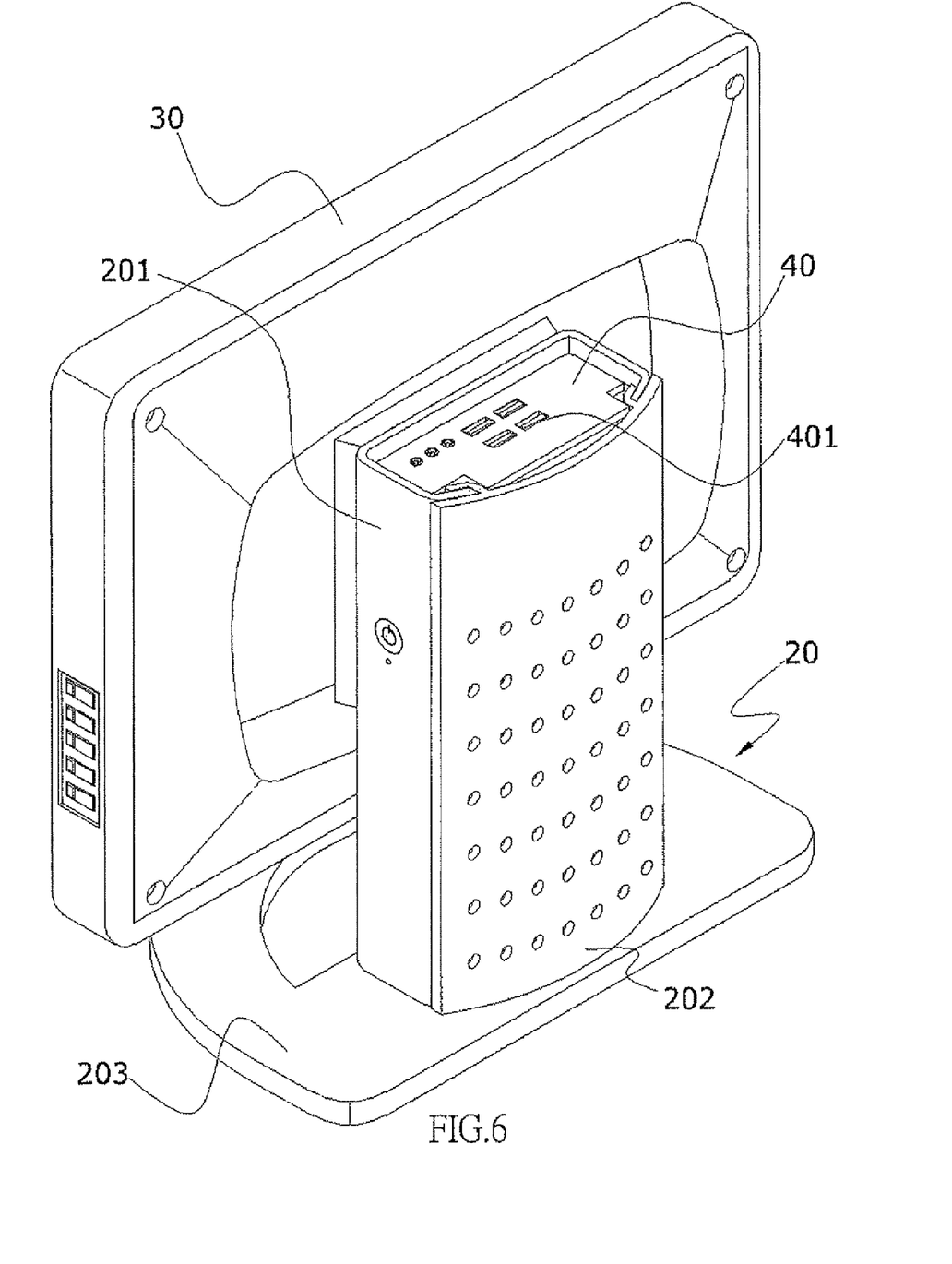
FIG. 6 is a first preferred embodiment of the present invention.

FIG. 6 is a first preferred embodiment of the present invention. As shown in FIG. 6, in addition to that the accommodation space 2011 (referring to FIG. 2) serves as a space for wiring, a main board module 40 is further mounted in the accommodation space 2011, such that the display support seat 20 in the present invention becomes a computer host at the same time. The main board module 40 usually means the main board module 40 in a computer host. The main board module 40 at least includes a central processor, a memory unit, a display interface unit, a storage device, and the like. In such a manner, in addition to that the display support seat 20 of the present invention provides functions of supporting and fixing the display 30, the computer host is also integrated in the complete structure at the same time, thereby effectively saving the space for constructing the computer. As shown in FIG. 6, after the mounting, the display 30 has a display function, and a complete computer is obtained when the informational communication between the display and the main board module 40 in the display support seat 20 is established. A user is able to completely construct a computer without a too large construction space. In addition, after the main board module 40 is mounted, all connecting ports 401 are exposed above the accommodation space 2011. Therefore, the informational communication between other peripheral information devices (for example, an external hard disk drive) and the main board module 40 may be established easily.

Figure 7:
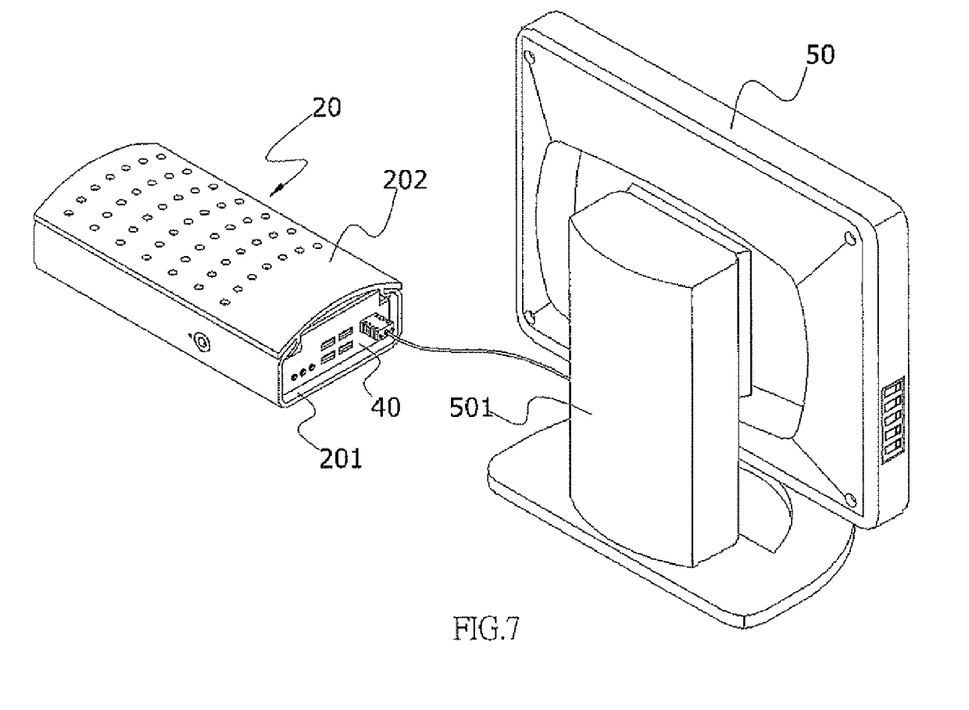
FIG. 7 is a second preferred embodiment of the present invention.

FIG. 7 is a second preferred embodiment of the present invention. As shown in FIG. 7, the display support seat 20 may also be separately applied outside the display. The display support seat 20 is located in a horizontal manner in a situation that the display support seat 20 is not mounted with the base seat 203. An accommodation space 2011 (referring to FIG. 2) is formed after the main seat 201 and the cover 202 are mounted, so as to from a computer casing integrally. The main board module 40 is then mounted in the accommodation space 2011 to obtain a computer host. Due to a small volume, the computer host does not occupy too large space even being located on a desktop. Next, a display 50 having a support seat 501 is in informational communication with the main board module 40, so as to form a complete computer.

Figure 8:
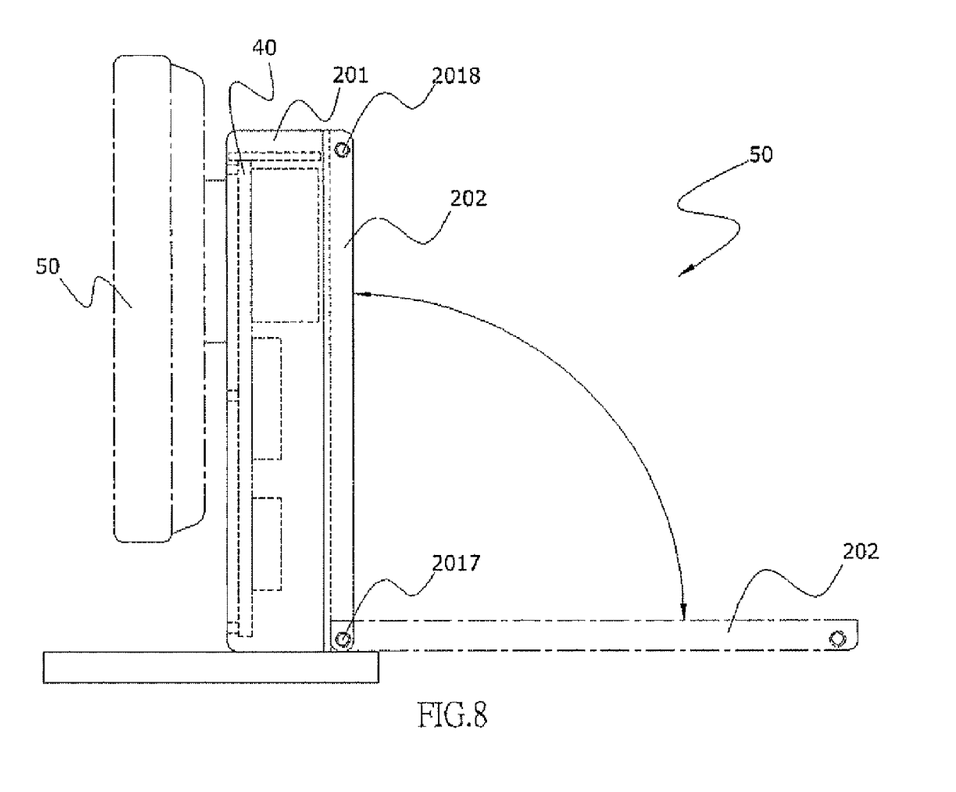
FIG. 8 is a third preferred embodiment of the present invention.

FIG. 8 is a third preferred embodiment of the present invention. As shown in FIG. 8, the main seat 201 of the display support seat 20 in the present invention and its cover 202 are mounted in a rail manner in the former embodiment. This embodiment further utilizes a pivotal part 2017, such that the main seat 201 and one end of the cover 202 are relatively pivoted, and a hook 2018 (a fixing screw is also applicable) is mounted at the other end of the cover 202. During the application, if the main board module 40 needs to be assembled or maintained, the cover 202 is raised after the hook 2018 is disengaged, such that the cover is at an open status about a position of the pivotal part 2017 to facilitate the assembly or maintenance for a user.

Figure 9:
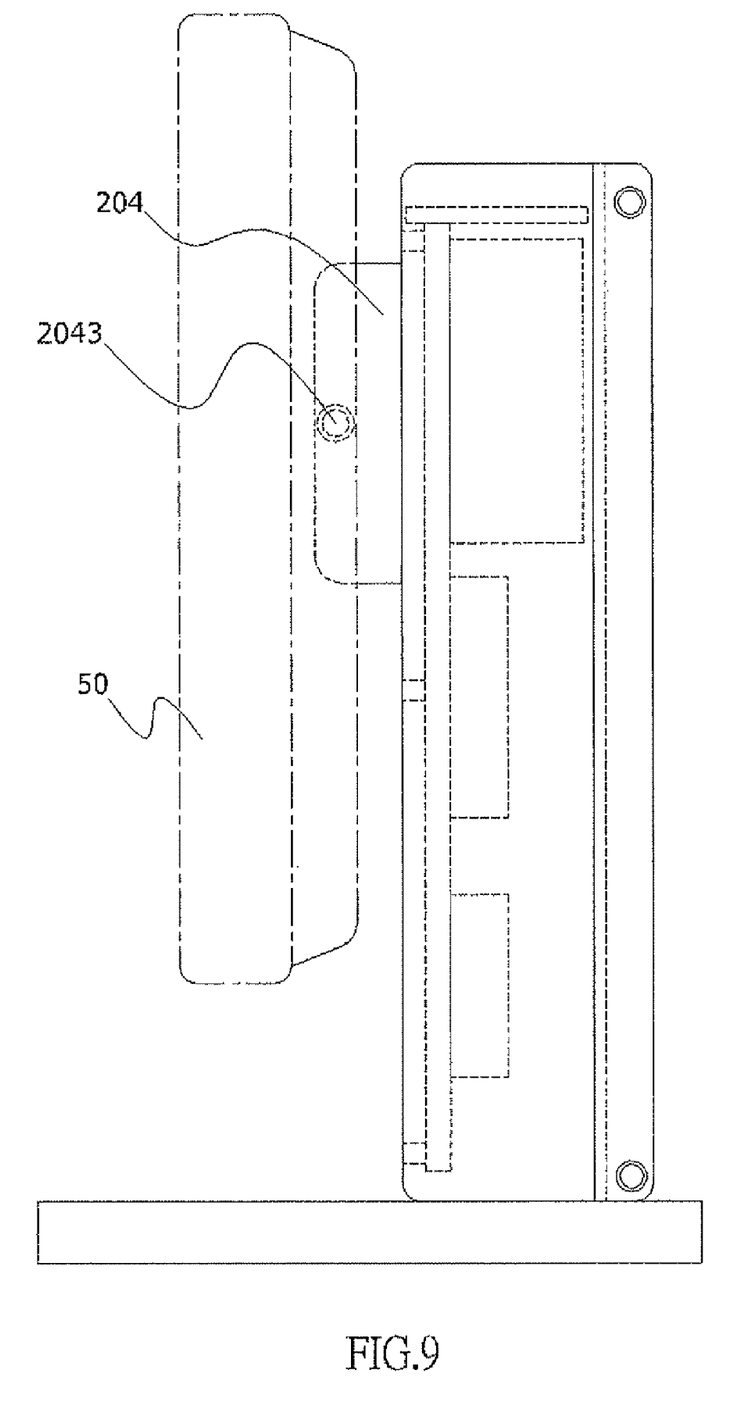
FIG. 9 is a fourth preferred embodiment of the present invention.

FIG. 9 is a fourth preferred embodiment of the present invention. As shown in FIG. 9, an angle adjusting device 2043 is further mounted at a position of the mounting bracket 204 of the display support seat 20. In such a manner, an angle is adjusted when the display 50 is being mounted, so as to further accord with a visual angle in practical use.

Figure 10:
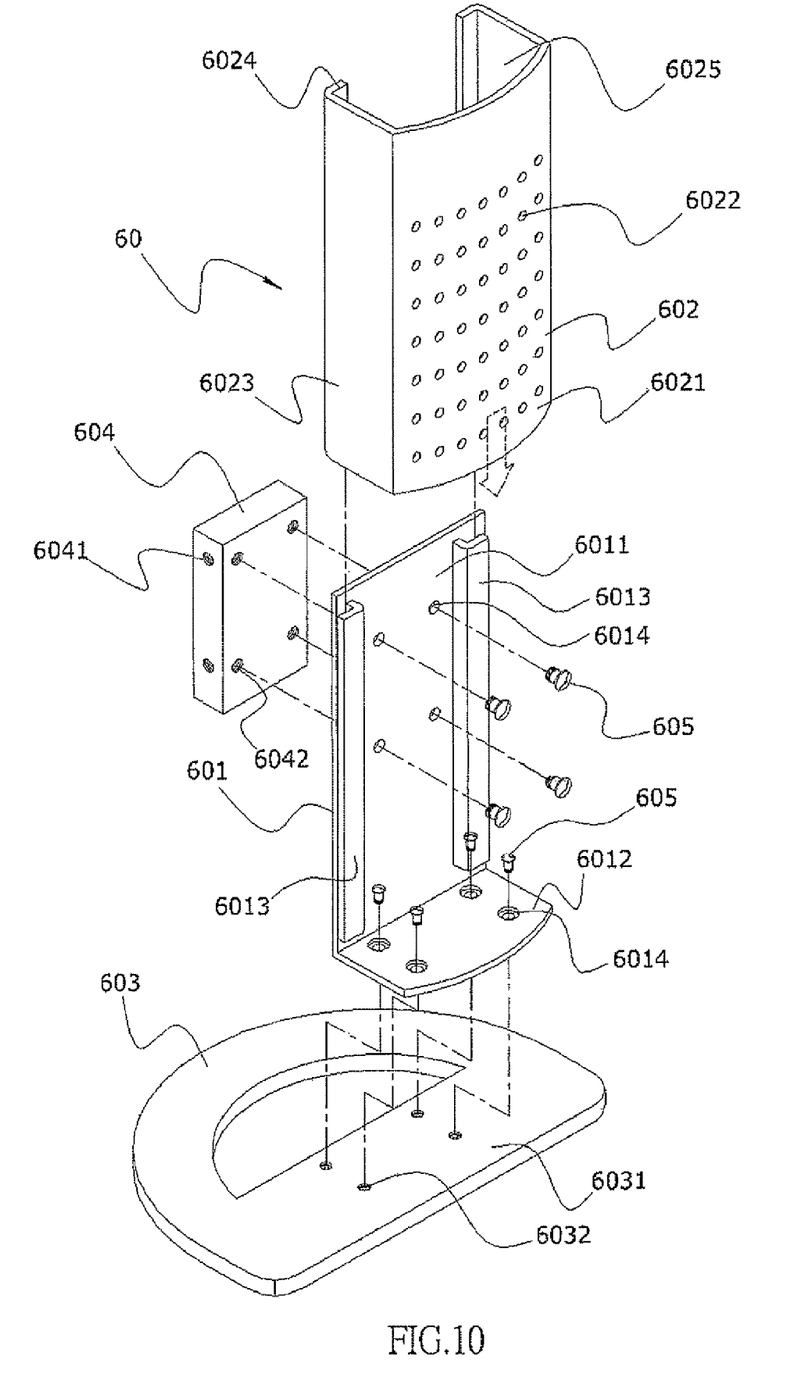
FIG. 10 is a fifth preferred embodiment of the present invention.

FIG. 10 is a fifth preferred embodiment of the present invention. As shown in FIG. 10, a support surface 6011 is formed at the main seat 601 of the display support seat 60. A base mounting part 6012 is connected and formed at a bottom. Also, a mounting part 6013 (the mounting part 6013 is in a rail shape in the embodiment of FIG. 10) is formed on a plane of the support surface 6011. A plurality of through holes 6014 is formed on the plane of the support surface 6011. In addition, a plurality of through holes 6014 is formed on a plane of the base mounting part 6012. A mounting face 6021 is formed at the cover 602. A plurality of through holes 6022 is formed on the mounting face 6021, and the plurality of through holes 6022 has a ventilation function, and is used for a main board module (not shown) to be secured. A baffle 6023 is respectively formed by bending two ends of the mounting face 6021, and a relative mounting part 6024 is formed by bending the ends of the two baffles 6023. As shown in FIG. 10, the relative mounting part 6024 is in a rail shape, which may also be replaced by other types, for example, a hook shape. A bottom plane of the base seat 603 enables the base seat 603 to be horizontally located on a plane. A plurality of screw holes 6032 is formed on the plane 6031 of the base seat 603. A plurality of screw holes (6041, 6042) is respectively formed on each plane of the mounting bracket 604. As shown in FIG. 10, when mounting the members, the seat 601 is mounted on the plane of the base seat 603. In this embodiment in FIG. 10, a plurality of screws 605 serves as fixing elements, such that the main seat 601 and the base seat 603 are mutually mounted. Also, the mounting bracket 604 is mounted on an external plane of the main seat 601. The cover 602 is mounted at the mounting part 6013 of the support surface 6011 of the main seat 601 (slide-in through rails) by the relative mounting part 6024. As shown in FIG. 10, the cover 602 slides in downwards along an edge of the mounting part 6013 with its mounting part 6023 to accomplish the mounting, and an accommodation space 6025 is formed between the main seat 601 and the cover 602 after the mounting.

Figure 11:
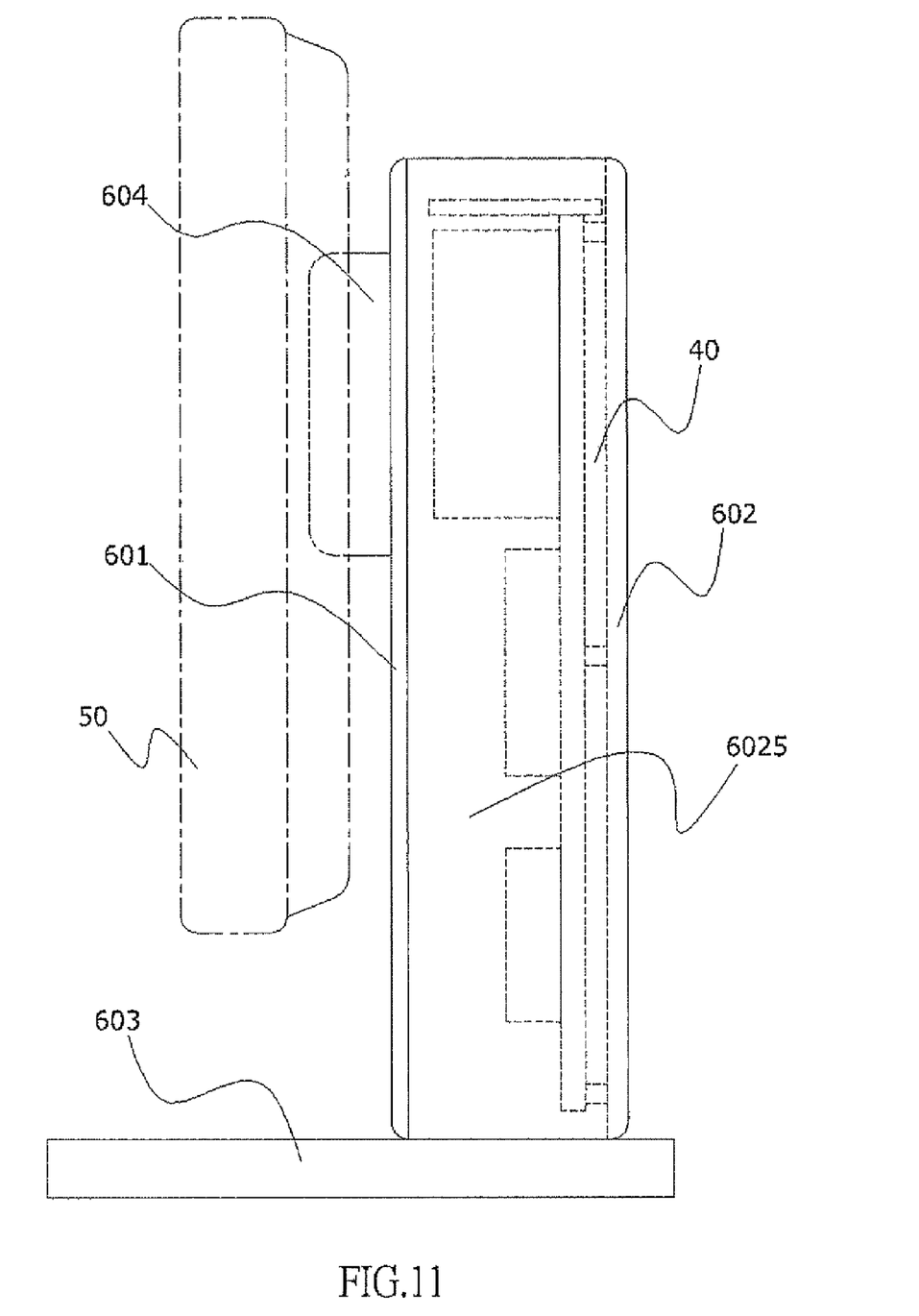
FIG. 11 is a sixth preferred embodiment of the present invention.

FIG. 11 is a sixth preferred embodiment of the present invention. As shown in FIG. 11, a main board module 40 is further mounted in the accommodation space 6025 to form a computer host, thereby effectively integrating the disposal space of the display 50 and the computer host.

As discussed above, in the present invention, after a main seat and a cover are mutually mounted, an entity having a supporting function is formed, and an accommodation space is formed between the two, so as to form a computer host after a main board module is mounted in the accommodation space. The present invention is further mounted with a display, such that the computer host and the display are integrated into one piece, thereby greatly reducing construction space of the computer. Moreover, during the application of the present invention, it is selected that the present invention merely serves as a support bracket, or a support bracket having a function of a computer host, or a computer host depending on practical use demands. In view of the above, after the present invention is implemented, an objective of providing a display support seat capable of providing a functional application after mounting according to use demands is definitely achieved.

However, it is understood that the descriptions above are only the preferable embodiments of the present invention, and not intended to limit the scope of the present invention. All equivalent modifications and changes made by those skilled in the art without departing from the spirit and scope of the present invention shall fall into the claims of the present invention.

What is claimed is:

1. A display support seat, for supporting a display such that the display is located on a plane after the display is mounted, comprising:
   a main seat, formed with a support surface, wherein a baffle is formed respectively at two edges of the support surface, and a horizontal mounting plane is formed at a bottom of the support surface;
   a cover, wherein a mounting part is formed on a plane of the cover, an accommodation space is formed after mounting the mounting part of the cover and the baffle of the main seat, and; wherein a main board module is disposed in the accommodation space to form a computer host after the mounting, the main board module including a plurality of connecting ports;
   a base seat, wherein a main seat is mounted on a plane of the base seat;
   a mounting bracket, mounted on the support surface of the main seat, and used to support and fix the display after the display is mounted; and wherein all connecting ports of the main board module are exposed above the accommodation space after the main board module is mounted in the accommodation space, so as to facilitate other information devices to accomplish informational communication with the main board module.

2. The display support seat according to claim 1, wherein the display and the main board module are in informational communication with each other to form a complete architecture of a computer.

3. The display support seat according to claim 1, wherein a plurality of air holes is formed on the cover plane.

4. The display support seat according to claim 1, wherein the mounting part of the cover is formed in a rail shape, the cover slides in the main seat through the mounting part, such that the mounting part and the baffle of the cover are mounted together.

5. The display support seat according to claim 1, wherein an angle adjusting device is further mounted on the mounting bracket for angle adjustment of the display.

* * * * *